(12) United States Patent
Genzel

(10) Patent No.: US 6,215,200 B1
(45) Date of Patent: Apr. 10, 2001

(54) VISUAL DISPLAY DEVICE

(76) Inventor: Bennett Ralph Genzel, P.O. Box 7962, Boulder, CO (US) 80306

( * ) Notice: Subject to any disclaimer, the term of this patent is extended or adjusted under 35 U.S.C. 154(b) by 0 days.

(21) Appl. No.: 09/176,407

(22) Filed: Oct. 20, 1998

Related U.S. Application Data

(60) Provisional application No. 60/062,925, filed on Oct. 21, 1997.

(51) Int. Cl.$^7$ ........................................... B60Q 1/46
(52) U.S. Cl. ........................ 307/10.1; 340/435; 340/901; 345/204; 345/214
(58) Field of Search ................. 307/10.1; 340/435, 340/901; 349/164; 362/540; 180/169; 315/159; 345/204, 207, 214

(56) References Cited

U.S. PATENT DOCUMENTS

| | | | |
|---|---|---|---|
| 3,949,362 | * 4/1976 | Doyle et al. | 340/435 |
| 4,240,220 | 12/1980 | Smith . | |
| 4,245,888 | 1/1981 | Wardecki . | |
| 4,600,913 | * 7/1986 | Caine | 340/435 |
| 4,833,469 | * 5/1989 | David | 340/901 |
| 5,103,326 | * 4/1992 | Fergason | 349/164 |
| 5,237,449 | 8/1993 | Nelson et al. . | |
| 5,303,130 | 4/1994 | Wei et al. . | |
| 5,333,071 | 7/1994 | Ishikawa et al. . | |
| 5,353,154 | 10/1994 | Lutz et al. . | |
| 5,436,741 | 7/1995 | Crandall . | |
| 5,442,526 | 8/1995 | Stowe, Jr. . | |
| 5,523,923 | 6/1996 | Stowe, Jr. . | |
| 5,537,003 | * 7/1996 | Bechtel et al. | 315/159 |
| 5,587,699 | 12/1996 | Faloon et al. . | |
| 5,657,056 | * 8/1997 | Izumi et al. | 345/214 |

* cited by examiner

*Primary Examiner*—Albert W. Paladini
(74) *Attorney, Agent, or Firm*—Marian J. Furst

(57) ABSTRACT

A passive reflective device provides a warning or message visible when the intensity of light incident on the device exceeds a preselected minimum intensity or threshold value. The device includes a display, in the form of statements, pictographs, or images, with an appearance which is altered in color or pattern when impinged upon by light with an intensity greater than the threshold value and viewed by a viewer in front of the device. The device can be used as a sign or stationary display, such as a road sign, or it can be mounted on or in a front vehicle facing behind the vehicle such that the display is visible from behind the vehicle by someone who is within a preselected range of angles. The device can be mounted on the bumper or body of the vehicle, and the display can provide information, such as a visible warning to the driver of the following vehicle that his or her lights are shining so brightly on the front vehicle so as to cause the driver of the front vehicle to become uncomfortable, distracted, and/or temporary blind due to reflections of the following vehicle's headlights in the front vehicle's rear view mirror or mirrors. The device may have several appearances which change as the light intensity progressively exceeds several corresponding threshold intensities.

26 Claims, 3 Drawing Sheets

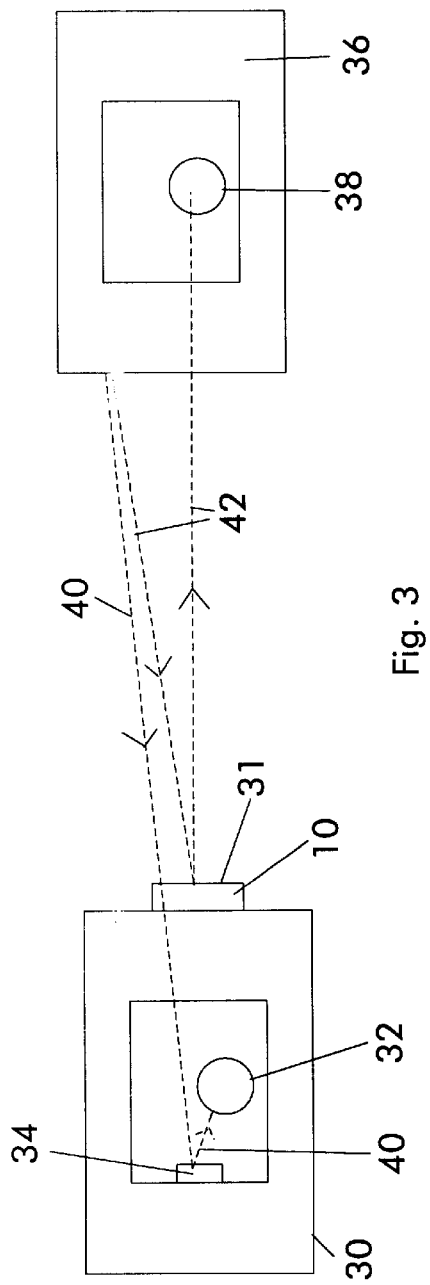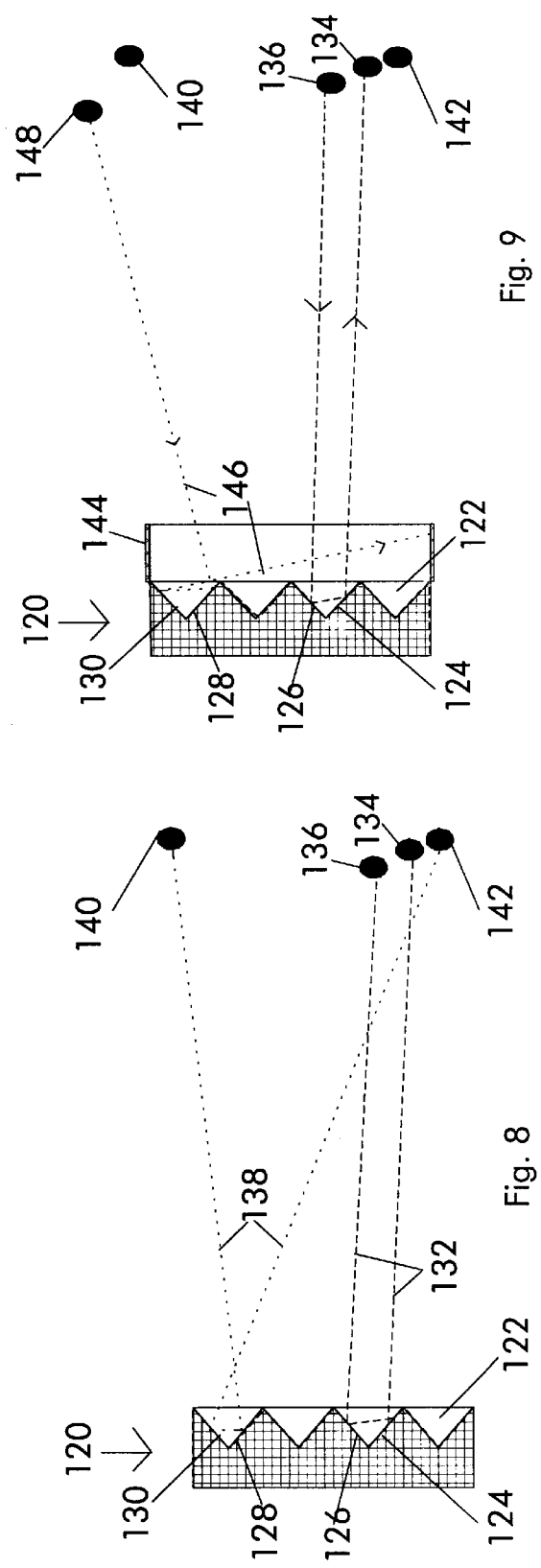

VISUAL DISPLAY DEVICE

This application claims the benefit of U.S. Provisional Application Ser. No. 60/062,925, filed Oct. 21, 1997.

BACKGROUND OF THE INVENTION

1. Field of the Invention

The present invention is related generally to signs and visual warning devices which convey different information at different light intensity levels, and more particularly to a device which can be mounted on a motor vehicle and which conveys one or more messages when light of one or more predetermined intensities is incident upon the device.

2. Description of Related Art

When driving a motor vehicle, it is often necessary and/or advisable to send a signal to other drivers to warn them of the presence or anticipated movements of the first vehicle. Devices commonly used to convey such signals include head lights, tail lights, and turn signal indicators. These types of signals are all intended to warn the driver of the following vehicle of actions of the front vehicle. Another type of signal which can be sent by a driver is to simply flash his or her vehicle's headlights to warn the driver of a vehicle approaching from the front that his or her headlights are too bright and are distracting or temporarily blinding the first driver.

However, there are other common types of situations in which it has been virtually impossible to warn other drivers when they are doing something which is distracting and/or dangerous to someone else. For example, when driving at night, the driver of a front vehicle can also become distracted and/or temporarily blinded by headlights from a following vehicle when they are reflected in the rear view mirrors of the front vehicle. This often occurs when the following vehicle has approached the first vehicle too closely with its "high beam" on; when the headlights of the following vehicle are mounted high relative to the position of the driver in the first vehicle, such as when a truck approaches a passenger vehicle; or because the following vehicle's headlights are incorrectly adjusted. In any case, the situation is dangerous as well as annoying for the driver of the first vehicle because it interferes with his or her ability to see and react to road conditions.

A common solution to this problem is to use rear view mirrors which can be adjusted so that the intensity of the reflection is reduced. However, these adjustable mirrors have two major shortcomings. First, the intensity of all reflected light is reduced, thereby significantly decreasing the driver's ability to observe other objects and his or her depth perception of the reflected images. Such rear view mirrors are generally adjusted by a manually operated switch, so the driver is faced with a choice of (a) having to remove his or her hand from the steering wheel to adjust the mirror whenever bright lights approach from behind or (b) leaving the mirror adjusted for limited reflection and compromising his or her awareness of what is happening around his or her automobile. Second, such adjustable rear view mirrors are not generally mounted externally to the vehicle, and the driver can still be distracted or blinded by light reflected from externally mounted mirrors.

In principle, all vehicles could be required to have properly adjusted headlights and the use of headlight high beams could be prohibited, partially solving the problem of distraction and blinding by bright headlights of a following vehicle. However, it is impractical for all vehicles to have properly adjusted headlights at all times. Simply loading the trunk of a passenger vehicle for a short trip can significantly increase the angle between the ground and the vehicle's headlight beam, and it may not always be easy to readjust the headlights properly. Also, prohibiting the use of high beams in rural areas, where there is no ambient or overhead lighting along the roadway at night, would be dangerous, as it also would diminish the driver's ability to see bends and obstacles in the road. Further, these requirements would not eliminate the situation where the driver of the first vehicle is exposed to intense light coming from a following truck or other vehicle with headlights mounted relatively high.

All of the signaling methods discussed above require the use of equipment which is placed in essentially all road vehicles during the manufacturing process. Headlights, tail lights, turn signals, and rear view mirrors are all relatively expensive items. Also, many of the existing signaling devices, including some rear view mirrors, utilize light sources and, therefore, installation requires the emplacement of wiring and connection to the vehicle's electrical system.

Thus, there is a need for a device which conveys different information with different incident light intensities. There is a further need for a device which provides a signal to a following driver that his or her vehicle's headlights are dangerously bright when reflected into the eyes of the driver of the forward vehicle. Preferably, such a signal can be transmitted without sending such a signal to other nearby drivers whose headlights are not offensive. There is a still further need for a signaling device with a signal which is visible only when the reflection is sufficiently bright to distract the driver of the forward vehicle. There is yet a further need for such a warning device which is inexpensive to produce. There is an additional need for a warning device which can be easily and inexpensively mounted to a vehicle at some time after the vehicle is manufactured. There is also a need for a device which operates by passive illumination, without requiring a light source powered by the electrical system of the vehicle to which it is mounted.

SUMMARY OF THE INVENTION

It is an object of the present invention to provide a signaling device with a signal which is visible to a viewer facing the device only when the illumination is brighter than a threshold light intensity.

It is a further object of the present invention to provide a device which informs a following driver that his or her vehicle's headlights are dangerously bright when reflected into the eyes of the driver of the forward vehicle.

It is also an object of the present invention to inform the driver of a following vehicle that his or her vehicle's headlights are dangerously bright without sending such a signal to other nearby drivers whose headlights are not offensive.

It is a still further object of the present invention to provide a visual warning device which is inexpensive to produce.

It is yet a further object of the present invention to provide a visual warning device which can be installed in or mounted to a vehicle during the vehicle manufacturing process.

It is an additional object of the present invention to provide a visual warning device which can be easily and inexpensively mounted to a vehicle at some time after the vehicle is manufactured.

It is also an object of the present invention to provide a signaling device which operates by passive illumination, without requiring a light source powered by the electrical system of the vehicle to which it is mounted.

To achieve the foregoing and other objects and in accordance with the purpose of the present invention broadly described herein, one embodiment of this invention comprises a reflective display device for providing a visual message to an observer in front of the device. The device comprises a display means having a first appearance when impinged upon by light originating in front of the display and having an intensity less than a threshold intensity. The display means also has a second appearance, with the message visible, when impinged upon by light originating in front of the display and having an intensity greater than the threshold intensity. The display means may have one or more additional appearances when impinged upon by light with an intensity greater than an additional threshold intensity. The display appearances differ from one another in color and/or pattern. The device also comprises means for reflecting incident light to provide the message to the observer. The device may be a stationary sign, or it may be mounted on a vehicle. In particular, the device may be mounted on the vehicle, such as in the form of a bumper sticker or a license plate holders which can be mounted such that the displays are visible to the observer when he or she is behind and facing the rear of the vehicle. The threshold light intensity may be preselected to an intensity which is distracting to a driver who sees the light reflected in his or her or her vehicle's rear view mirror, and the message may convey a safety warning indicating that the intensity of the incident light is too great or that the distance between the first and second vehicles is too small, and therefore, that the light is distracting to the driver of the vehicle.

The device may comprise at least one sheet of material including therein a first set of indicia visible under normal ambient lighting conditions and a second set of indicia visible only when an incident light intensity exceeds a preselected threshold value. Each of the sets of indicia may be selected from text, pictographs, images, and combinations thereof. The device may include at least one element selected from masks, filters, holograms, lenses, and prisms to aid in creating the displays. The device also may include at least one material which fluoresces or phosphoresces, such as to provide all or a part of the second display when the light intensity exceeds the threshold. The device includes a reflecting surface, which may either be substantially smooth or may form a three-dimensional pattern, and the surface may be substantially planar or non-planar. The device may also be adapted to reflect light which originates within a first preselected range of angles to make the display visible to the observer when he or she is within a second preselected range of angles.

Another embodiment of the present invention comprises a method for conveying a warning from a first vehicle to a second driver of a second vehicle behind the first vehicle when the headlights of the second vehicle shine in a generally forward direction and are intense enough to distract the driver of the first vehicle when reflected in a rear view mirror. The warning may signal that the headlights of the second vehicle are distracting to the driver. The method comprises the step of providing a passive display device on the first vehicle which can be viewed by the second driver. The display device includes a first display, visible under normal ambient lighting conditions, and a second display, visible when an incident light intensity exceeds a preselected threshold intensity. The second display conveys the warning to the second driver. For example, the threshold light intensity may be an intensity which is distracting to a driver who sees the light reflected in his or her or her vehicle's rear view mirror, and the warning could indicate that the second vehicle is too close to the first vehicle and/or that the second vehicle's headlights are blinding the driver of the first vehicle. The display device may include one or more additional displays which convey additional messages when the light exceeds progressively higher threshold intensities.

The method may also comprise one or more additional steps of masking, filtering, and/or diffracting a portion of the incident light. Also, the method may further comprise an additional step of selecting light which originates within a preselected range of angles relative to a surface of the device and reflecting at least some of the light so the displays are visible to the observer when he or she is within a second preselected range of angles relative to the surface.

The first and second displays may differ in color and/or pattern. The message may have a form selected from text, pictographs, images, and combinations thereof.

BRIEF DESCRIPTION OF THE DRAWINGS

These and other features, aspects, and advantages of the present invention will become better understood with reference to the following description, appended claims, and accompanying drawings, where:

FIG. 3 is a plan view showing the paths of light beams from the headlights of a following vehicle with respect to a front vehicle, their drivers, and one embodiment of the present invention;

FIG. 8 is a cross sectional view showing the paths of light beams incident on yet another embodiment of the present invention; and FIG. 9 is a cross sectional view showing the paths of light beams incident on still another embodiment of the present invention.

DESCRIPTION OF THE INVENTION

The present invention is a passive reflective device which provides a warning or message visible when the intensity of light incident on the device exceeds a preselected minimum intensity or threshold value. The device includes a display, in the form of statements, pictographs, or images, with an appearance which is altered in color or pattern when impinged upon by light with an intensity greater than the threshold value and viewed by a viewer in front of the device.

The device of the present invention can be used as a sign or stationary display, such as a road sign, or it can be mounted on or in a front vehicle facing the rear of the vehicle and visible from behind the vehicle by someone who is within the preselected range of angles. For example, it could be mounted on the bumper or body of the vehicle, and the message could provide a visible warning to the driver of the following vehicle that his or her lights are shining so brightly on the front vehicle so as to cause the driver of the front vehicle to become uncomfortable, distracted, and/or temporary blind due to reflections of the following vehicle's headlights in the front vehicle's rear view mirror or mirrors. This distraction or blinding of the driver of the front vehicle can pose a potentially dangerous situation, particularly when there is little ambient light and the vehicles are moving at high speed, such as when driving at night on highways passing through rural areas. The headlights of the following vehicle may appear overly bright to the driver of the front vehicle for a variety of reasons, such as headlight misalignment, use of the high beam in too close proximity to the front vehicle, or the headlights being mounted high relative to the height of the eyes of the front vehicle's driver. Until now, it has been difficult or impossible for the driver of the front automobile to convey any type of message to the driver of the following vehicle regarding the following vehicle.

Figure 1A:
FIG. 1a is a front view of one embodiment of the present invention under relatively low light conditions.
Figure 1B:
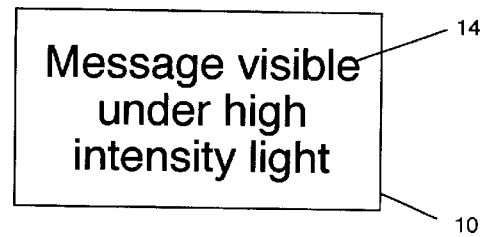
FIG. 1b is a front view of the same embodiment of the present invention shown in FIG. 1a, except that high intensity light is incident upon the device.
Figure 2:
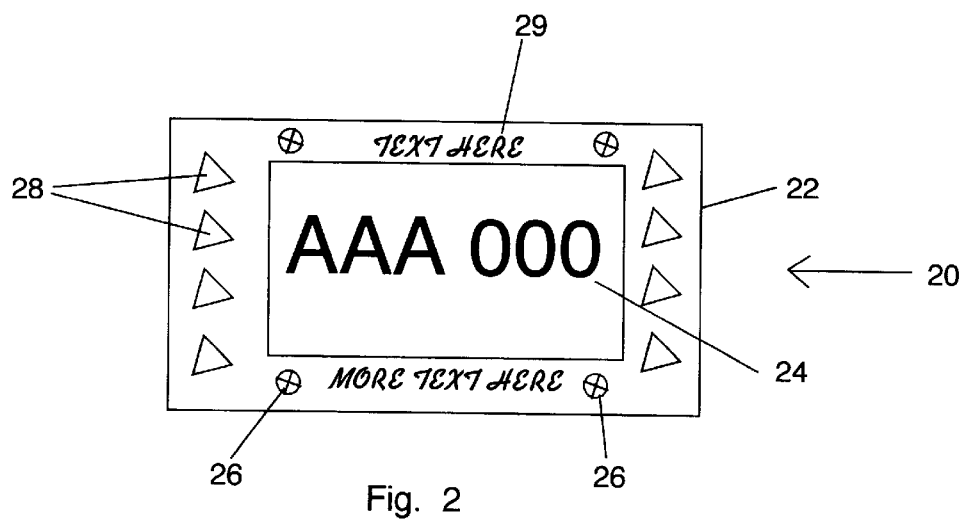
FIG. 2 is a front view of another embodiment of the present invention.

As illustrated in FIG. 1a, the present invention 10 comprises a display 12 that has one appearance under light conditions such as might be found during normal daylight or nighttime situations. As shown, the display is a regular geometric pattern 12, although the display could be a field of a uniform solid color, a text message, or any other pattern. In FIG. 1b, the same device shown in FIG. 1a comprises an altered display 14 that is visible when the light intensity exceeds the threshold value, such as when a vehicle headlight beam is incident upon it. The display can be in the form of a stationary sign, or it can be mounted to the exterior or interior of a vehicle, such as an automobile or truck. As shown in FIG. 1, the display can be a bumper sticker. As shown in FIG. 2, the display 20 can be incorporated into a frame 22 for a license plate 24 which can attached to the back of a vehicle, such as with screws or bolts 26. For example, when the light intensity is less than the threshold value, the display may show one type of indicia, such as a geometric pattern 28, and when the light intensity exceeds the threshold value, the display may become highly reflective and/or show different indicia in the form of a color change, a text, or a pictorial message 29, such as a notice to a following driver that his headlights are so bright they are annoying the driver of the vehicle on which the frame 22 is mounted. The threshold light intensity can be an intensity which is distracting to a driver who sees the light reflected in his or her or her vehicle's rear view mirror.

Referring to FIG. 3, it can be seen in a general way how the present invention works. A display device 10 is mounted on the rear of front vehicle 30, with display device 10 mounted so that its front surface 31 faces away from and behind front vehicle 30. Front vehicle 30 is driven by a front driver 32 (whose head is shown as a circle) and is also equipped with a rear view mirror 34. Following vehicle 36 with driver 38 is directly behind front vehicle 30, with a headlight directed generally forward toward front vehicle 30. Light beam 40 is reflected by rear view mirror 34 into the eyes of driver 32, potentially distracting and/or temporarily blinding driver 32. Light beam 42 is reflected by display device 10 and reaches the eyes of following driver 38. By incorporating a suitable pictorial or text message into device 10, following driver 38 can be informed that his lights are distracting to front driver 32. If display device 10 reflects only a fraction of the incident light, the reflected light will not blind the following driver 38. Display device 10 can be adapted so that the reflected light intensity allows the message to be visible to following driver 38 only when the incident light intensity exceeds the threshold intensity which will cause discomfort and/or distraction to front driver 32. The threshold intensity may be selected according to the needs or comfort of a particular driver.

Figure 4:
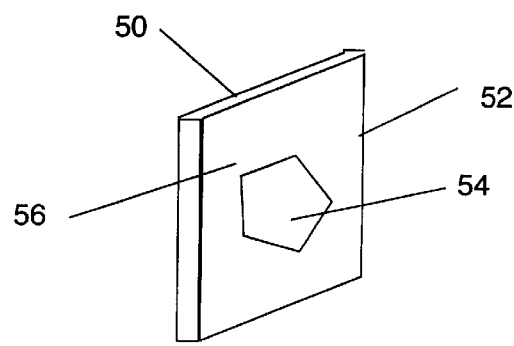
FIG. 4 is a perspective view of an embodiment of the present invention.

As shown in FIG. 4, one embodiment of the present invention is a display device 50 having a substantially smooth and planar surface 52. Device 50 also includes a display pattern 54 and a background 56 which is incorporated into the material on which surface 52 is formed. Pattern 54 and/or background 56 are formed, for example, with one or more materials which fluoresce visibly when exposed to light which exceeds the threshold intensity. The fluorescent material or materials can be arranged to form a message which is visible to a person in front of device 50 when the intensity of light incident on device 50 exceeds the threshold value. Alternatively, one or more phosphorescent materials can be utilized in place of the fluorescent material or materials. The fluorescent and/or phosphorescent materials can be selected and arranged to provide a multicolored display.

Figure 5:
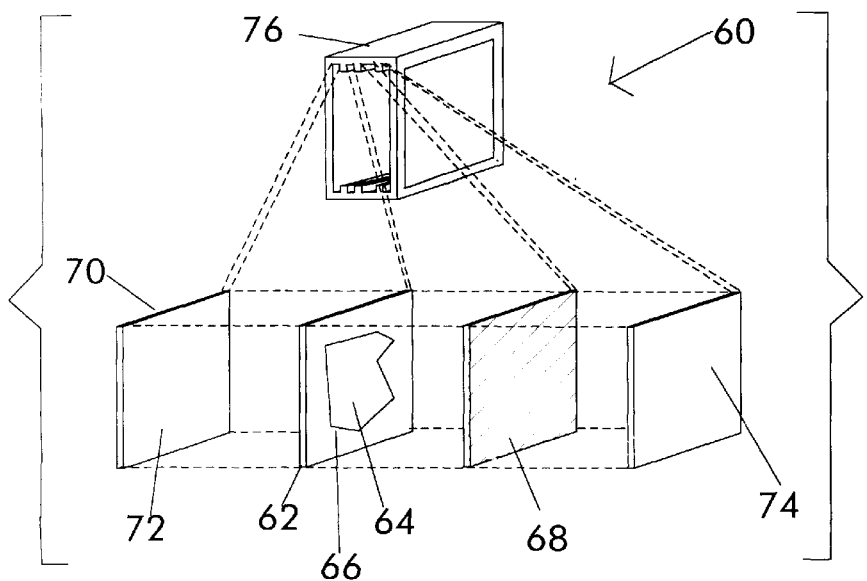
FIG. 5 is an exploded perspective view of another embodiment of the present invention.

Another embodiment 60 of the present invention is shown in FIG. 5. A mask 62, having a pattern 64 and a background 66, and light filter 68 are sandwiched between a reflecting element 70, having a substantially smooth reflecting surface 72, and substantially transparent cover element 74. Mask 62 can be painted or printed onto surface 72, or it can be secured in contact with surface 72, or it can be secured in a spaced apart position relative to surface 72. Mask 62 can be formed from a combination of substantially opaque and substantially transparent materials arranged in pattern 64 and background 66. Alternatively, mask 62 can include a hologram, or it can include fluorescent or phosphorescent materials. Filter 68 can be a gray filter, transmitting a fraction of the light incident upon it over all visible wavelengths, or it can selectively transmit light over a range of visible wavelengths. Filter 68 can also include a diffraction grating. The device may include more than one filter, and the filters may be identical or have distinct filtering capabilities. Cover element 74 is sealed against frame or holder 76 to prevent water and dirt from entering the assembly 60.

Figure 6:
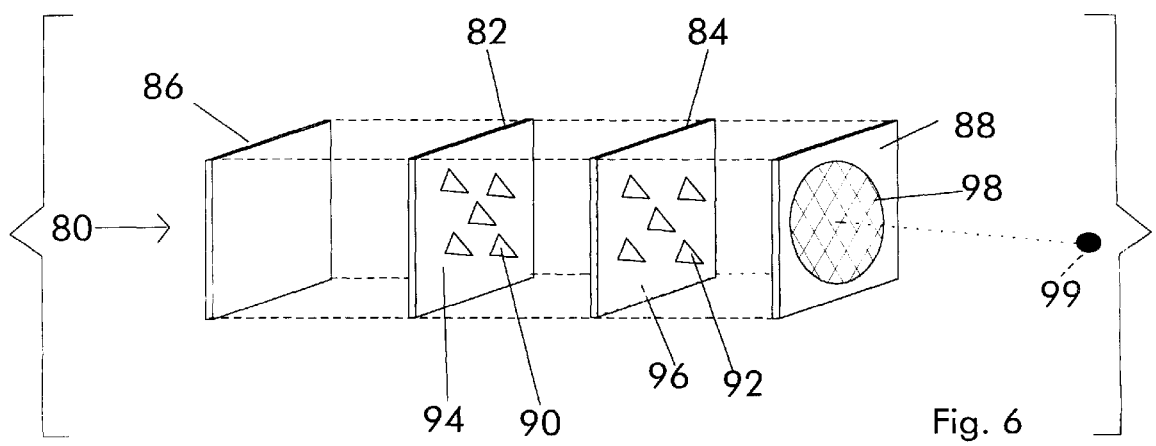
FIG. 6 is an exploded perspective view of another embodiment of the present invention.

In the embodiment 80 shown in FIG. 6, two masks 82 and 84 are sandwiched between reflecting element 86 and cover element 88. Masks 82 and 84 each have a pattern portion 90 and 92, respectively, and a background portion 94 and 96, respectively. The pattern and background portions may be arranged in identical or different geometric relationships to each other. The respective patterns and backgrounds may be of the same color or different colors, and the patterns may be formed using materials of different transmissibility to visible light. The patterns and backgrounds may be formed with combinations of opaque, transparent, fluorescent, phosphorescent, and diffracting materials. The visibility of the patterns 90 and 92 and/or backgrounds 94 and 96 may depend upon the intensity of light incident on device 80; the materials used to form masks 82 and 84 can be selected such that a viewer at position 99 can observe images having different patterns and/or brightnesses, depending upon the intensity of the light which is incident on device 80. As shown in FIG. 6, cover element 88 includes a lens 98 to focus transmitted light.

Figure 7:
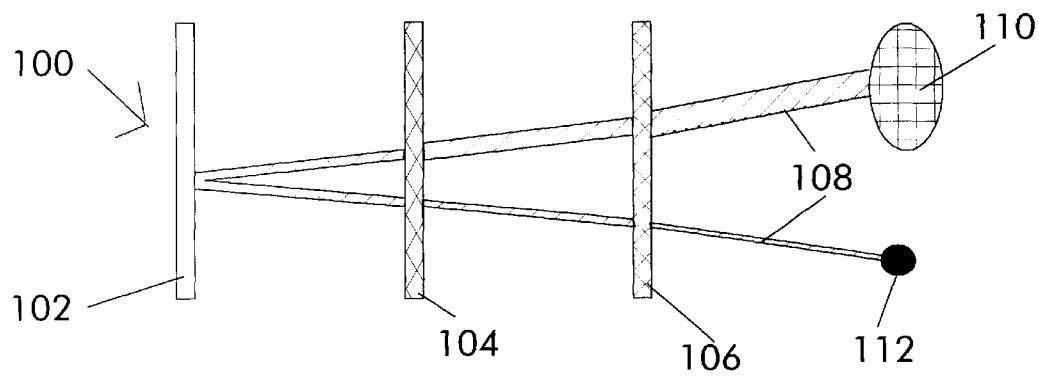
FIG. 7 is an exploded side view of another embodiment of the present invention, additionally showing the changes in the intensity of light incident on and reflected by the device.

As shown in FIG. 7, device 100 includes a reflecting element 102, including a pattern and a background, and filtering elements 104 and 106. Light ray 108 from source 110 is attenuated as it passes through elements 104 and 106, with the relative intensity of ray 108 shown by the line width. The reflectivity of reflecting element 102 and the transmissiveness of filtering elements 104 and 106 can be selected such that the intensity of ray 108 is great enough for an observer at 112 to recognize the pattern only when the intensity of the light incident from sources such as 110 is greater than the threshold value.

If desired, the device may be constructed so that only light incident from a selected range of angles relative to the reflecting surface will be reflected and/or so that reflected light will be visible within another selected range of angles relative to the reflecting surface. This can be accomplished by using diffraction gratings or holograms, known in the art, as masks and/or filters. Alternatively, as shown in FIGS. 8 and 9, a reflecting element 120 having a reflecting surface 122 formed in a 3-dimensional array of surface elements may be used. As shown, surface elements including 124, 126, 128, and 130 form a cubic reflector. A light beam 132 originating at source 134 is reflected by element 124 and then by element 126 and observable at point 136. Obliquely incident light beam 138, such as might come from a source at point 140, is reflected by elements 128 and 130 toward point 142. The addition of an absorbing rim 144, extending at least partially around the edges of surface 122, prevents obliquely incident light beams, such as 146 originating from point 148, from reaching surface 122 and obliquely reflected light from reaching observers at points such as 142.

It should be noted that one or more other refracting devices, such as a prism, could be utilized instead of or in addition to a lens, such as 98 in FIG. 6. The arrangement of filters, masks, lenses, and other refracting devices relative to each other can be selected to achieve the desired results.

It is contemplated that some embodiments of the present invention can be fabricated inexpensively from inexpensive materials. Thus, the invention could be mounted to the rear bumper, rear windshield, or body of a vehicle. It is also contemplated that the present invention could be fabricated into a form which can be incorporated into a vehicle during the manufacturing process, or it could be easily mounted after assembly of a motor vehicle, such as with adhesive, magnets, bolts, or other fasteners.

It is also contemplated that the message or messages visible under higher intensity light could contain information other than safety-related messages.

The foregoing description is considered as illustrative only of the principles of the invention. Further, since numerous modifications and changes will readily occur to those skilled in the art, it is not desired to limit the invention to the exact construction and process shown as described above. Accordingly, all suitable modifications and equivalents may be resorted to falling within the scope of the invention.

I claim:

1. A reflective display device for providing a visual message to an observer in front of said device, said device comprising:

display means having a first appearance when impinged upon by light originating in front of said display and having an intensity less than a threshold intensity, said display means having a second appearance when impinged upon by light originating in front of said display and having an intensity greater than said threshold intensity, said second appearance including said message; and means for reflecting incident light to provide said message to the observer;

wherein said appearances of said display differ in at least one characteristic selected from color and pattern, and said display means does not include a light source.

2. The device of claim 1, wherein said message has a form selected from text, pictographs, images, and combinations thereof.

3. The device of claim 1, wherein said device is a stationary sign.

4. The device of claim 1, wherein said light originates within a preselected range of angles relative to a surface of said device and said message is visible to the observer within a second preselected range of angles relative to said surface.

5. The device of claim 1, wherein said display means includes at least one element selected from masks, filters, holograms, lenses, prisms, fluorescent materials, and phosphorescent materials, wherein each of said elements is positioned in the light path between said means for reflecting and the observer, and each of said elements is operative to control the appearance of said display to the observer.

6. The device of claim 1, wherein:

said display means includes at least one additional appearance when impinged upon by light originating in front of said display, the light having an intensity greater than an additional corresponding threshold intensity, each of said additional appearances including an additional corresponding message; and all of said appearances of said display differ from one another in at least one characteristic selected from color and pattern.

7. The device of claim 1, wherein said reflecting means includes a substantially smooth and planar surface reflecting surface.

8. The device of claim 1, wherein said reflecting means includes a non-planar reflecting surface.

9. A reflective display device adapted for mounting to a vehicle, said device comprising:

display means for providing a display that is visible to an observer behind the vehicle, said display having a first appearance when impinged upon by light originating behind said vehicle, said light having an intensity less than a threshold intensity, said display also having a second appearance including a safety warning when impinged upon by light having an intensity greater than said threshold intensity and originating behind said vehicle; and means for reflecting said light originating behind said vehicle to provide said warning to the observer;

wherein said appearances of said display differ in at least one characteristic selected from color and pattern; and wherein said warning indicates to the observer that the light intensity is great enough to distract a driver of the vehicle.

10. The device of claim 9, wherein said message has a form selected from text, pictographs, images, and combinations thereof.

11. The device of claim 9, wherein said light originates within a preselected range of angles relative to a surface of said device and said message is visible to the observer within a second preselected range of angles.

12. The device of claim 9, wherein said light greater than said threshold light intensity is distracting to a driver who sees the light reflected in his or her vehicle's rear view mirror.

13. The device of claim 9, wherein said device is selected from the group consisting of bumper stickers and license plate holders.

14. A method for conveying a warning from a first vehicle to a second driver of a second vehicle, the second vehicle traveling in substantially the same direction as the first vehicle and having headlights shining in a generally forward direction, the warning signaling that the headlights of the second vehicle are distracting to a driver of the first vehicle, the method comprising the step of:

providing a passive display device on the first vehicle which can be viewed by the second driver, the display device including a first display visible under normal ambient lighting conditions and a second display visible when an incident light intensity exceeds a preselected threshold intensity, the second display conveying the warning to the second driver, wherein said passive display device operates without a light source other than the incident light.

15. The method of claim 14, further comprising the step of masking a portion of the incident light.

16. The method of claim 14, further comprising the step of filtering a portion of the incident light.

17. The method of claim 14, further comprising the step of diffracting a portion of the incident light.

18. The method of claim 14, further comprising selecting light which originates within a preselected range of angles relative to a surface of said device;

and wherein the observer is within a second preselected range of angles relative to said surface.

19. The method of claim 14, wherein said message has a form selected from text, pictographs, images, and combinations thereof.

20. The method of claim 14, wherein said displays differ in at least one characteristic selected from color and pattern.

21. The method of claim 14, wherein said warning indicates at least one of the intensity of the incident light and the distance between the first and second vehicles.

22. The method of claim 14, wherein said threshold light intensity is an intensity which is distracting to a driver who sees the light reflected in his or her or her vehicle's rear view mirror.

23. A passive reflective display device comprising at least one sheet of material including therein a first set of indicia visible under normal ambient lighting conditions and a second set of indicia visible only when an incident light intensity exceeds a preselected threshold value, wherein said display device operates without a light source other than the incident light.

24. The device of claim 23, wherein each of said sets of indicia is selected from text, pictographs, images, and combinations thereof.

25. The device of claim 23, wherein said sets of indicia differ in at least one characteristic selected from color and pattern.

26. The device of claim 23, wherein said display device comprises at least one element selected from masks, filters, holograms, lenses, prisms, fluorescent materials, and phosphorescent materials, wherein each of said elements is positioned in the path of the incident light or the path of light reflected within said device.

* * * * *